United States Patent

Ramaseder et al.

[11] Patent Number: 5,902,372
[45] Date of Patent: May 11, 1999

[54] PROCESS AND APPARATUS FOR PROCESSING A SHREDDER LIGHT FRACTION IN A MELT

[75] Inventors: Norbert Ramaseder, Linz; Eduard Koppensteiner, Pasching; Hermann Schubert, Linz; Johannes Müller, Neumarkt, all of Austria

[73] Assignee: Voest Alpine Industrieanlagenbau GmbH, Linz, Austria

[21] Appl. No.: 08/772,093

[22] Filed: Dec. 20, 1996

[30] Foreign Application Priority Data

Dec. 21, 1995 [AT] Austria ..................... 2087/95

[51] Int. Cl.$^6$ ....................................... C22B 4/00
[52] U.S. Cl. .................. 75/10.4; 75/10.41; 75/10.42; 75/414; 75/530
[58] Field of Search ............... 75/10.41, 10.42, 75/530, 529, 540, 533, 10.4, 414; 266/222, 268

[56] References Cited

U.S. PATENT DOCUMENTS 4,385,753  5/1983  Leroy et al. .
4,887,800  12/1989 Hotta et al. .
5,634,960  6/1997  Cowx ........................................ 75/10.5

FOREIGN PATENT DOCUMENTS

| 0035451 | 9/1981 | European Pat. Off. . |
| 0521844 | 1/1993 | European Pat. Off. . |
| 0597270 | 5/1994 | European Pat. Off. . |
| 3437418 | 4/1986 | Germany . |
| 4238020 | 8/1994 | Germany . |
| 4402025 | 7/1995 | Germany . |
| 1 486 539 | 9/1977 | United Kingdom ............ 266/222 |

*Primary Examiner*—Melvyn Andrews
*Attorney, Agent, or Firm*—Greenblum & Bernstein, P.L.C.

[57] ABSTRACT

A process and apparatus for processing a shredder light fraction including multi-duct nozzle having at least an end section positionable within a metallurgical vessel containing a molten metal bath. The shredder light fraction may be fed into the molten metal bath while using only small quantities of carrier gas, e.g., air or nitrogen, and protective gas, e.g., hydrocarbon or inert gas. The shredder light fraction and the carrier gas may be injected into the molten metal bath as a main jet and oxygen may also be injected into the molten metal bath as a secondary jet. The primary jet and the secondary jet may be surrounded by a gas jet formed by the protective gas being injected into the molten metal bath.

16 Claims, 4 Drawing Sheets

5,902,372

PROCESS AND APPARATUS FOR PROCESSING A SHREDDER LIGHT FRACTION IN A MELT

CROSS-REFERENCE OF RELATED APPLICATIONS

The present invention claims the priority under 35 U.S.C. § 119 of Austrian Patent Application No. A 2087/95 filed on Dec. 21, 1995.

FIELD OF THE INVENTION

The present invention relates to a process and apparatus for processing a shredder light fraction in a melt, in particular when producing a molten metal bath. The shredder light fraction and a carrier gas may be injected into a melt through a multi-duct nozzle. The injected shredder light fraction and carrier gas may form a main jet out of the nozzle and into the melt. A secondary jet may be formed out of the nozzle by injected oxygen, and at a point of entry into the melt, the main jet and the secondary jet may be enclosed by another gas jet formed by a protective gas including hydrocarbon gas and/or inert gas or mixtures thereof.

DISCUSSION OF THE BACKGROUND INFORMATION

A process for processing polluted carbonaceous substances accumulating as a shredder light fraction, upon the disposal of scrap vehicles, into granulates and pneumatically feeding them into the high-temperature zone of a metallurgical shaft furnace is discussed in German Patent document No. DE-A-44 02 025. A shredder light fraction is formed from disposal, i.e., shredding, of scrap vehicles and other scrap devices, e.g. motorcycles, cars, railway wagons, etc. The light fraction, which accumulates during shredding and which includes mainly organic matter, is ground and prepared to free it from metal particles and enable further processing.

The shredder light fraction is formed by various materials utilized in the scrap vehicle or scrap device, e.g., woven fabrics, various types of plastics, imitation leather, foamed plastics, plastic or cellulose sheathing materials, e.g., consoles, instrument panels, door and roof linings, seals, etc. Accordingly, the structure of the shredder light fraction is fibrous to granular, the fibrous structure being formed from the textile fibers of woven fabrics and the granular structure being formed, in general, by grinding compact plastic parts.

It is essential that the shredder light fraction be processed in a high-temperature zone, e.g., where temperature ranges up to 800° C. should be passed through quickly, because when low temperature carbonization occurs, dioxin and furan formation results. According to DE-A-44 02 025, shredder light fraction is processed by restructuring it through extrusion. The granulates formed by the extrusion are further reduced and pneumatically fed to the high temperature zone of a metallurgical shaft furnace, e.g., a blast furnace.

The process of feeding pneumatically conveyable pulverized substances into a metallurgical vessel through one or several multi-media nozzles located either beneath or above the bath surface is generally discussed in German Patent document No. DE-C-42 38 020, which proposes centrally feeding ground coke suspended in nitrogen through a multi-media nozzle. Externally to, and concentric with, the coke-nitrogen jet, oxygen is injected into the metallurgical vessel. Externally to, and concentric with, the injected oxygen, air is injected into the metallurgical vessel. Externally to, and concentric with the injected air, a protective medium, e.g., natural gas, can be injected into the metallurgical vessel. Heavy melting loss, due to the multimedia nozzles cannot be avoided because breeze, oxygen and natural gas yield a very high flash temperature. Thus, the refractory lining material enclosing the multimedia nozzle shows premature wear.

Furthermore, the process of feeding contaminated pulverized material into the metallurgical vessel by admixing it to the pulverized coke or through other media ducts of the multi-media nozzle is shown in DE-C-42 38 020.

SUMMARY OF THE INVENTION

An object of the invention is to avoid the above-noted disadvantages and difficulties of the prior art and to provide a process for processing the shredder light fraction, and for feeding the shredder light fraction into a melt, which involves little expenditure and does not require any special pretreatment or post-treatment of the shredder light fraction. The present invention may also be directed to an apparatus (facility) for feeding the shredder light fraction into the melt that has a long service life, i.e., minimizing the occurrence of repair work and shutting down of the metallurgical vessel receiving the melt. The present invention may also be directed to utilizing comparatively small amounts of conveying gas and protective gas to achieve a high conveying capacity, so that the metallurgical processes taking place in the metallurgical vessel remain largely unaffected.

According to the present invention, the above-noted drawbacks of the prior art may be solved by injecting the shredder light fraction and a carrier gas into a melt. The injected shredder light fraction and carrier gas may form a main jet into the melt. A secondary jet may be formed by injected oxygen, and at a point of entry into the melt, the main jet and the secondary jet may be enclosed by a gas jet formed by a protective gas including hydrocarbon gas and/or inert gas or mixtures thereof.

The shredder light fraction may include a high cracking energy. Cracking processes may take place between the hydrocarbon gas fed to the melt and the shredder light fraction to yield a cooling effect at the shredder light fraction point of entry into the melt. The cooling effect may be sufficient to form a solid porous mushroom of solidified melt around the main jet point of entry. The solid porous mushroom of solidified melt may protect the point of entry and the refractory material enclosing the point of entry both from erosion by bath agitation of the melt and from oxidation by the fed oxygen.

Shredder light fraction may be injected into a molten metal bath, e.g., a steel melt, which yields a particularly high degree of energy utilization of the injected shredder light fraction. Carbon monoxide formed in the metal bath ascends through the melt to a furnace chamber. The furnace chamber may also receive oxygen to use in post-combustion of the carbon monoxide. The post-combusted carbon monoxide may form carbon dioxide and also provide efficient scrap heating.

According to an alternative of the process according to the present invention, the shredder light fraction may be injected into an area of a slag layer covering a molten metal bath. This arrangement advantageously protects the nozzles feeding the shredder light fraction, resulting in a longer service life and exposes the nozzles to less destructive attacks than an arrangement beneath the metal bath level. Thus, danger of furnace breakout may be particularly low.

The cracking energy of the injected shredder light fraction withdraws so much thermal energy from the point of entry that, during injection of the shredder light fraction, a nitrogen natural gas mixture, preferably in a mixing ratio of between approximately 2:1 to 5:1, can be used as protective gas.

The shredder light fraction may include the main elements, e.g., C, $H_2$, $N_2$, S, preferably C, in 20% of the total element quantity.

It may be expedient to use air and/or nitrogen and/or inert gas as the carrier gas. The use of air may be particularly inexpensive, and may also keep the point of entry clear in case the injection of shredder light fraction is interrupted.

The shredder light fraction (SLF) may be mechanically conveyed to the melt, at least near the point of entry.

A particularly efficient energy utilization of the shredder light fraction may be achieved by injecting the shredder light fraction into a steel melt beneath the steel melt bath level.

To achieve a long service life of the feeding nozzles, the shredder light fraction may be injected into a slag layer covering a steel melt beneath the slag bath level and above the steel melt bath level.

The amount of shredder light fraction (with the carrier gas) fed into the melt per unit of time and the amount of protective gas fed to the melt may be preferably monitored and harmonized with each other in terms of quantity. Thus, the point of entry may prevented from clogging because an electric arc furnace may always approximate the liquidus temperature of the liquid bath of the melt during melting down.

The quantity ratio of shredder light fraction and protective gas may preferably be in a range of approximately 50 to 200 $kg/Nm^3$.

Clogging of the point of entry of the shredder light fraction may be prevented by monitoring the pressure of the main jet prior to flowing into the metal bath as a function of the amount of shredder light fraction to be conveyed. The pressure, if it has been unintentionally increased, may be reset to the desired level by increasing the amount of oxygen.

The quantity ratio of shredder light fraction and oxygen may be maintained within a desired range for stoichiometric combustion of the shredder light fraction.

The process according to the present invention can be particularly advantageous during melting down of scrap using electric arc energy, where the shredder light fraction may be fed into the metal bath during the entire scrap melting process.

An apparatus for performing the process according to the present invention may include a multi-duct nozzle installed in a metallurgical vessel. The multi-duct nozzle may include a duct for feeding the shredder light fraction and carrier gas and another duct for feeding oxygen. Each of the ducts may be externally enclosed by an annular duct feeding a protective gas into the melt.

The duct for the shredder light fraction may be enclosed by an annular duct forming an second duct that may be enclosed by an external annular duct conveying the protective gas.

In an alternative embodiment of the present invention, the apparatus may include a multi-duct nozzle having an insert positioned within a central duct forming at least two ducts. The shredder light fraction may be fed through at least one of the ducts and oxygen may be conveyed through the remaining ducts. The insert may have a cross section of four sector-pattern ducts forming a circular cross sectional area in the central duct.

The ducts may include pressure gauges and flow meters. The pressure gauges and flow meters may be linked via an open or closed-loop control device.

The duct for feeding the shredder light fraction may include a mechanical conveying device, e.g., a screw conveyor, positioned within the duct to assist in conveying the shredder light fraction toward the melt.

The central pipe may be movable in longitudinal direction and may form a central duct.

The multi-duct nozzle may be located at a level beneath the bath level within the metallurgical vessel, e.g., the metal bath level or the slag bath level.

Also, the present invention may be directed to an apparatus for performing a process for processing a shredder light fraction in a vessel including molten metal bath. The apparatus may include a multi-duct nozzle having at least an end section positioned within the molten metal bath, a first duct that injects the shredder light fraction and a carrier gas into the molten metal bath as a main jet, a second duct that injects oxygen into the molten metal bath as a secondary jet, and an annular duct injecting a protective gas into the molten metal bath as a gas jet. The gas jet may concentrically enclose the main jet and the secondary jet.

In accordance with another feature of the present invention, the first duct may be concentrically positioned within the second duct, and the second duct may be concentrically positioned within the annular duct. Further, an oxygen duct may be concentrically positioned within the first duct.

In accordance with still another feature of the present invention, the second duct may be concentrically positioned within the first duct, and the first duct concentrically positioned within the annular duct.

In accordance with a further feature of the present invention, the apparatus may also include a central pipe and a cross-shaped insert positioned within the central pipe. The cross-shaped insert and the central pipe may form the first duct and the second duct. Further, the first duct may include diametrically opposite portions formed by the cross-shaped insert and the central pipe, and the second duct may include diametrically opposite remaining portions formed by the cross-shaped insert and the central pipe.

In accordance with yet another feature of the present invention, the protective gas and the shredder light fraction may combine at a point of entry to protect the end section of the nozzle and surrounding material of the vessel from erosion and oxidation. Further, the combination of the protective gas and the shredder light fraction in the molten metal bath may yield a cooling effect sufficient to form a solid porous mushroom of solidified melt around the point of entry.

Other features and benefits of the present invention may be recognized by referring to the drawings and the following detailed description of the present invention.

BRIEF DESCRIPTION OF THE DRAWINGS

The present invention is further described in the detailed description which follows, in reference to the noted plurality of drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawings making apparent to those skilled in the art how the several forms of the invention may be embodied in practice.

Figure 1:
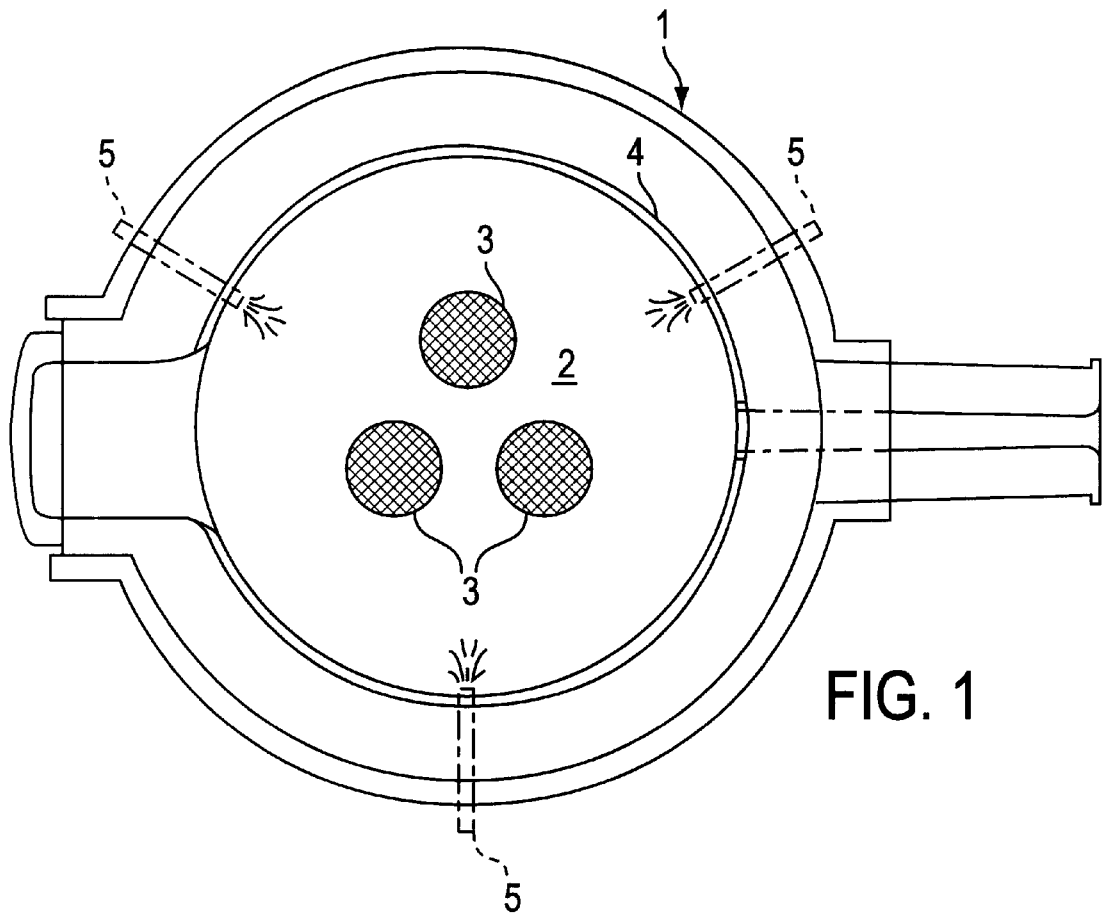
FIG. 1 illustrates a schematic plan view of a metallurgical vessel for use with the present invention.

In accordance with the present invention, FIG. 1 shows a metallurgical vessel 1, e.g., an electric arc furnace containing a molten metal bath 2, e.g., a steel melt, produced by melting down scrap. The scrap may be melted down by applying electric power electrodes 3 made of, e.g., graphite. Molten metal bath 2 may accumulate in a lower part 4 of metallurgical vessel 1 which may include at least one, and preferably several multi-duct nozzles 5. The multi-duct nozzles 5 may be positioned either beneath a steel bath level or in a slag area, e.g., beneath the slag bath level. Multi-duct nozzles 5 may be utilized to feed a shredder light fraction (SLF) into molten metal bath 2.

Figure 2:
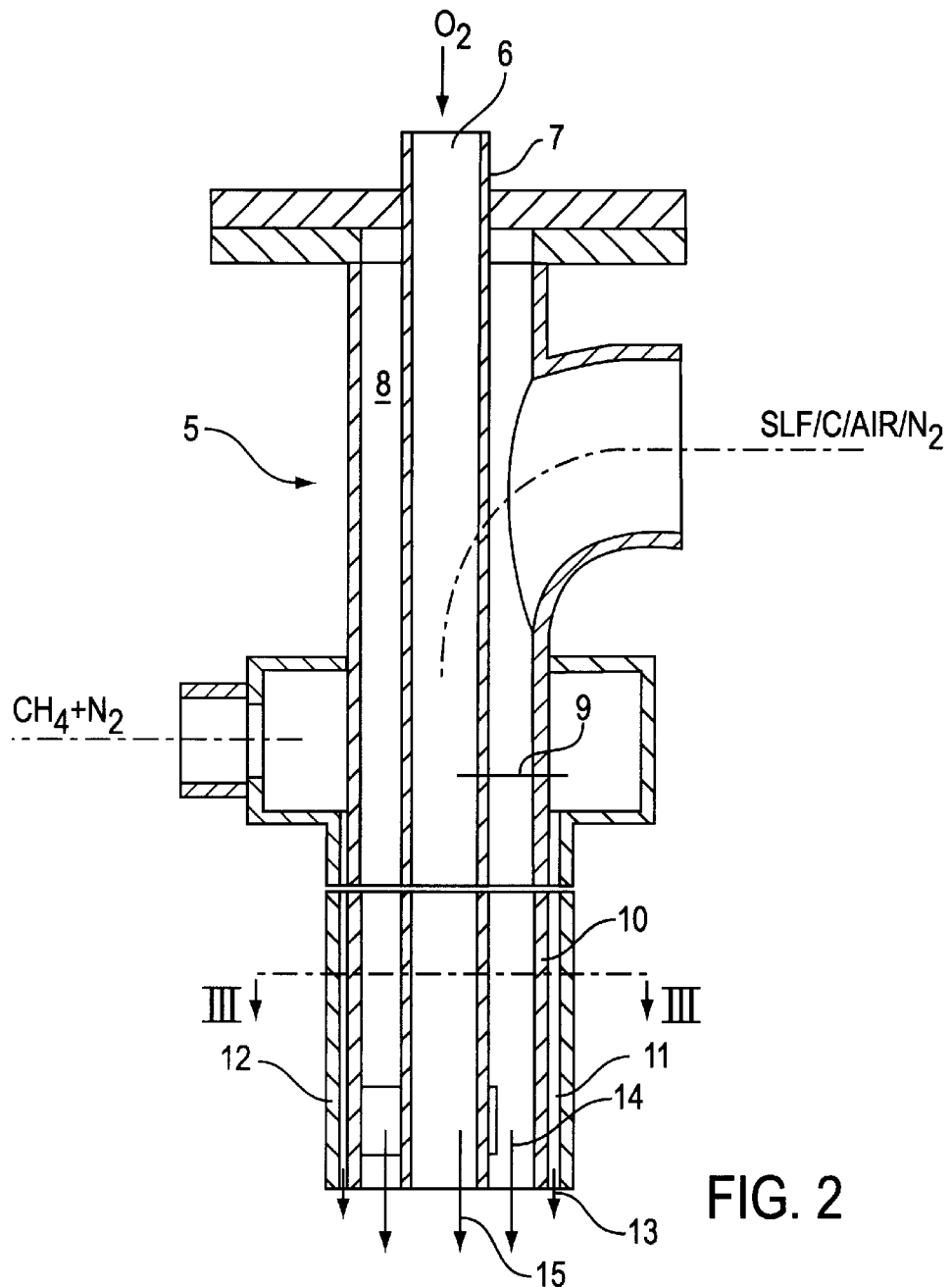
FIG. 2 illustrates a longitudinal section of a nozzle for feeding a shredder light fraction into a melt.
Figure 3:
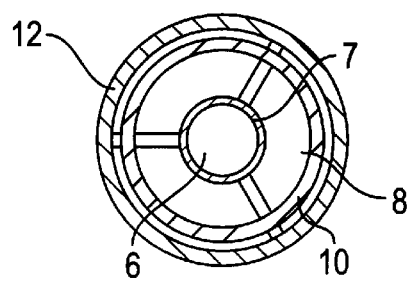
FIG. 3 illustrates a sectional view of the nozzle shown in FIG. 2 taken along lines III—III.

An exemplary view of a multi-duct nozzle 5 may be illustrated, for example, in FIGS. 2 and 3. Multi-duct nozzle 5 may include a central pipe 7 that forms a central duct 6 for feeding (supplying) oxygen to molten metal bath 2. Central pipe 7 may be enclosed (concentrically encircled) by an annular duct 8 formed by a jacketed pipe 10. Annular duct 8 may include a gap width 9 of a size sufficient to adequately feed the shredder light fraction into the melt.

The shredder light fraction may be conveyed with a carrier gas, e.g., air or nitrogen, through annular duct 8 and into metallurgical vessel 1. The shredder light fraction and carrier gas leaving duct 8 may produce a main jet 14. The injected oxygen may exit central duct 6 as a secondary jet 15. Annular duct 8 may be enclosed (concentrically encircled) by jacketed pipe 12 forming annular duct 11 having a small gap width. A protective gas, comprising, e.g., hydrocarbon gas and/or inert gas or mixtures thereof, may be fed into metallurgical vessel 1 through annular duct 11 as a gas jet 13. Further, the hydrocarbon gas can be optionally mixed with nitrogen. Jets 14 and 15 may be enclosed (concentrically encircled) by a produced jacket formed by protective gas jet 13. Concentrically arranged central pipe 7 may be movably positionable in a longitudinal (i.e., axial) direction with respect to jacketed pipe 12.

Figure 4:
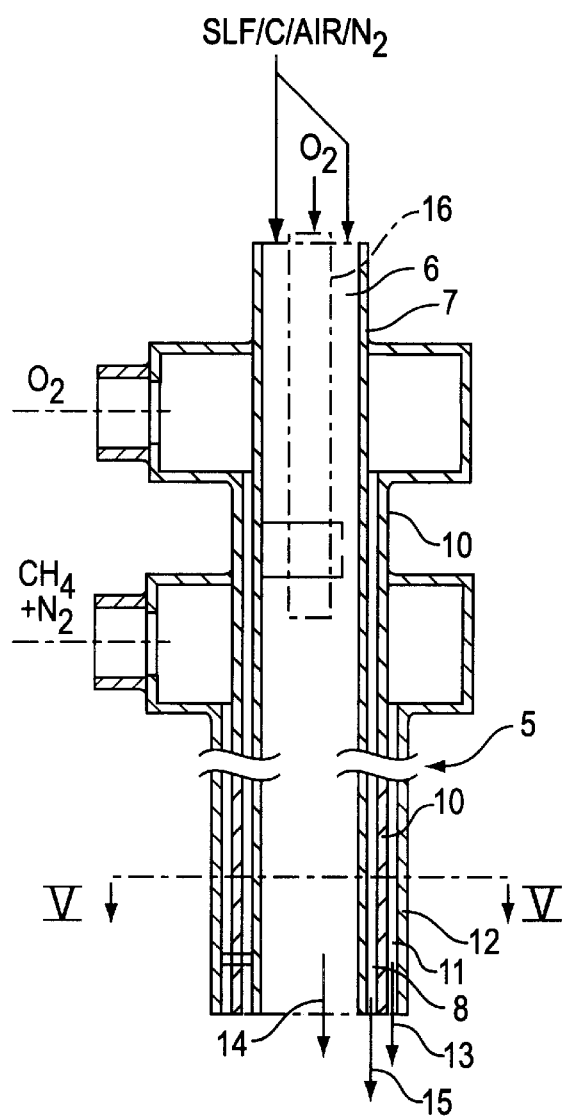
FIG. 4 illustrates a longitudinal section of an alternative embodiment of a nozzle for feeding a shredder light fraction into a melt.
Figure 5:
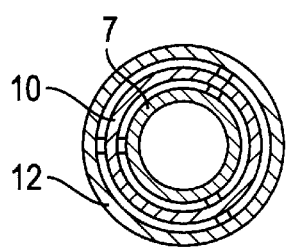
FIG. 5 illustrates a sectional view of the nozzle shown in FIG. 4 taken along lines V—V.

An alternative exemplary view of a multi-duct nozzle 5 may be illustrated, e.g., in FIGS. 4 and 5. The shredder light fraction and a carrier gas may be fed into metallurgical vessel 1 through central pipe 7. In this alternative arrangement, central pipe 7 may be larger in diameter than central pipe 7 utilized in the embodiment of FIGS. 2 and 3. Central pipe 7 may be enclosed by a first jacketed pipe 10 to form an annular duct 8 having a small width for injecting oxygen into metallurgical vessel 1. A jacketed pipe 12 may be provided around first jacketed pipe 10 to form a duct for injecting gas jet 13, comprising protective gas, into metallurgical vessel 1. Jacketed pipe 12 may be arranged to enclose both main jet 14, comprising the SLF and the carrier gas, and secondary jet 15, comprising the injected oxygen. As shown in FIG. 4 by a broken line 16, a concentrically installed oxygen feeding pipe 16 can be provided within central pipe 7 for feeding additional oxygen to the SLF and carrier gas mixture. Oxygen feeding pipe may be axially movable with respect to central pipe 7.

Figure 6:
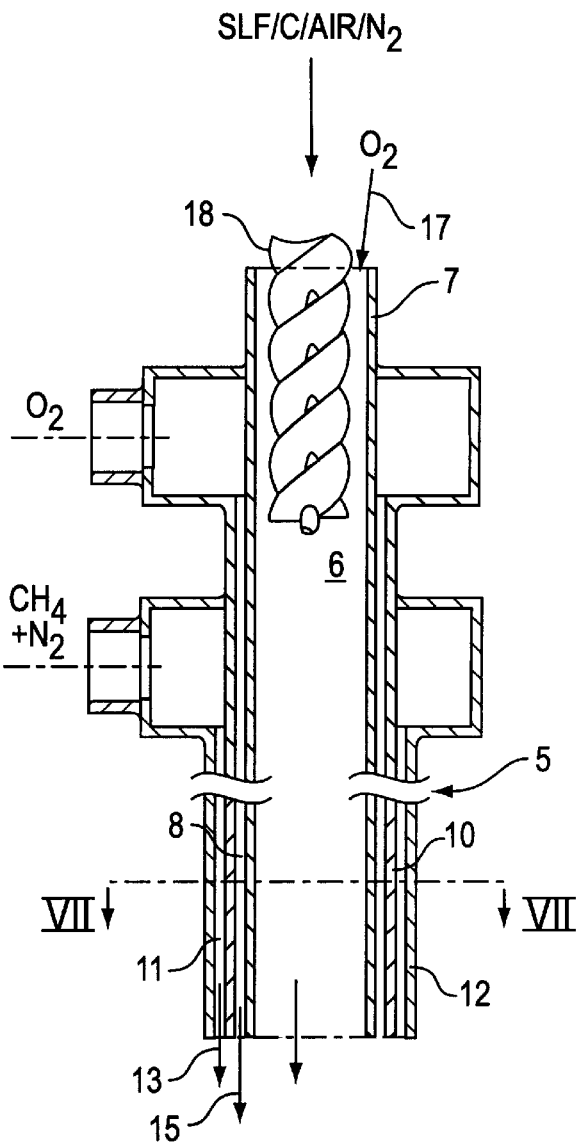
FIG. 6 illustrates a longitudinal section of another alternative embodiment of a nozzle for feeding a shredder light fraction into a melt.
Figure 7:
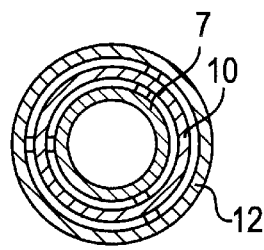
FIG. 7 illustrates a sectional view of the nozzle shown in FIG. 6 taken along lines VII—VII.

An exemplary view of an alternative embodiment of multi-duct nozzle 5 may be illustrated, e.g., in FIGS. 6 and 7. The shredder light fraction may be injected through central pipe 7 with the carrier gas. Further, oxygen may also be admixed with the shredder light fraction and carrier gas, if necessary, as indicated by arrow 17. In central pipe 7, a mechanical conveying device 18, e.g., a screw conveyor, may be concentrically positioned to facilitate conveying shredder light fraction toward the melt. However, conveying device 18 may terminate before an end section of multi-duct nozzle 5 that is inserted into metallurgical vessel 1.

Figure 8:
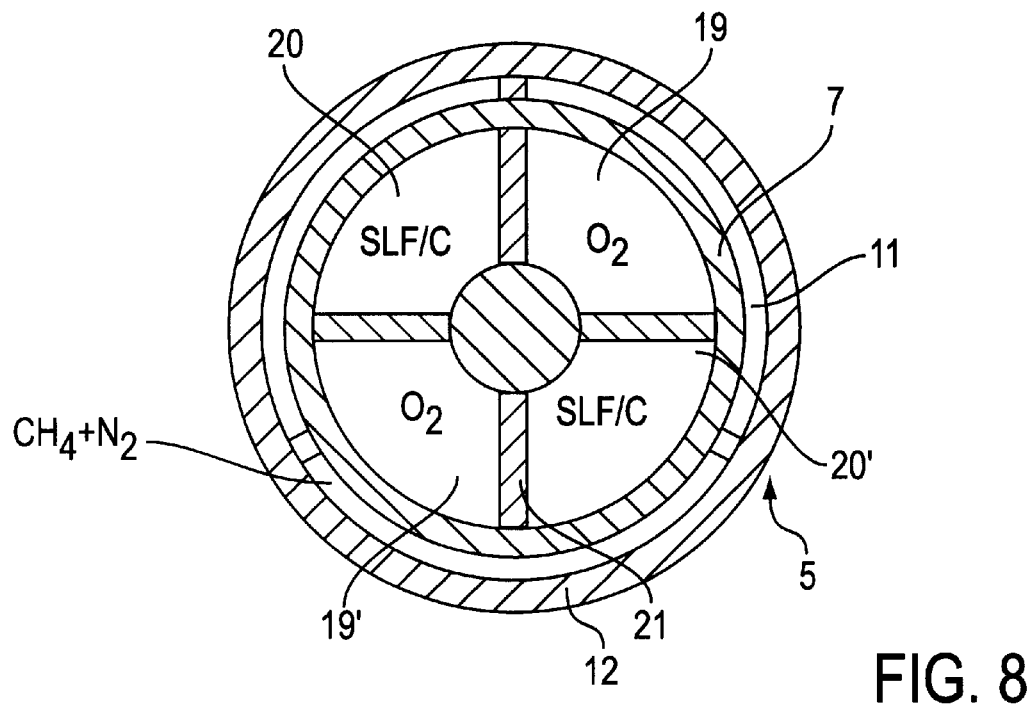
FIG. 8 illustrates a cross-sectional view of another alternative embodiment of a nozzle for feeding a shredder light fraction into a melt.

An exemplary view of a further alternative embodiment of multi-duct nozzle 5 may be illustrated, e.g., in FIG. 8. Central pipe 7 of multi-duct nozzle 5 may be subdivided into four sector cross sections forming, e.g., feeding ducts 19, 19', 20, and 20'. An insert 21 having cross-shaped section may be positioned longitudinally within central pipe 7 to form the four sectors. Further, insert 21 may be twisted over its length within central pipe 7. The shredder light fraction (and carrier gas) may be injected into metallurgical vessel 1 through feeding ducts 20 and 20', which may be positioned diametrically opposite each other, while the oxygen may be fed through ducts 19 and 19' positioned adjacently between ducts 20 and 20'. Jacketed pipe 12 may be positioned outside of central pipe 7 to form an annular duct 11 for injecting the protective gas jet 13 into metallurgical vessel 1.

In accordance with the preferred embodiment of the present invention, the gaseous media utilized with multi-duct nozzles 5 and the metallurgical vessel 1 may be maintained within certain predetermined pressure ranges. For example, the oxygen may be maintained at between approximately 8 and 12 bar; the nitrogen and hydrocarbon gas (protective gas) may be maintained at between approximately 4 and 9 bar; and the compressed air (carrier gas) conveying the shredder light fraction may be maintained between approximately 4 and 7 bar.

The sections of multi-duct nozzle 5 which may contact the shredder light fraction, e.g., central pipe 7 and jacketed pipe 10, may be made of, e.g., special steel and may be coated with, e.g., alumina ($Al_2O_3$). The end sections of pipes 7 and 10 may also be completely made of, e.g., alumina. Jacketed pipe 12 can be made of, e.g., steel grade St37 or special steel.

An end section of multi-duct nozzle 5 may be inserted into metallurgical vessel 1 through the bottom of the vessel and may be positioned either vertically or at a slight angle of inclination from vertical or through a side wall of the vessel and may be positioned at an angle of inclination below approximately ±45°, and preferably between approximately +15 and approximately −35°, to the horizontal. In the above, a negative angle of inclination indicates a downward inclination of the nozzle end, i.e. towards the bottom of metallurgical vessel 1.

The number of multi-duct nozzles 5 utilized may depend on the furnace geometry, on the furnace size and on the amount of shredder light fraction injected to the melt per multi-duct nozzle 5. According to FIG. 1, three multi-duct nozzles 5 are shown projecting through the side wall of lower part 4 of metallurgical vessel 1.

Figure 9:
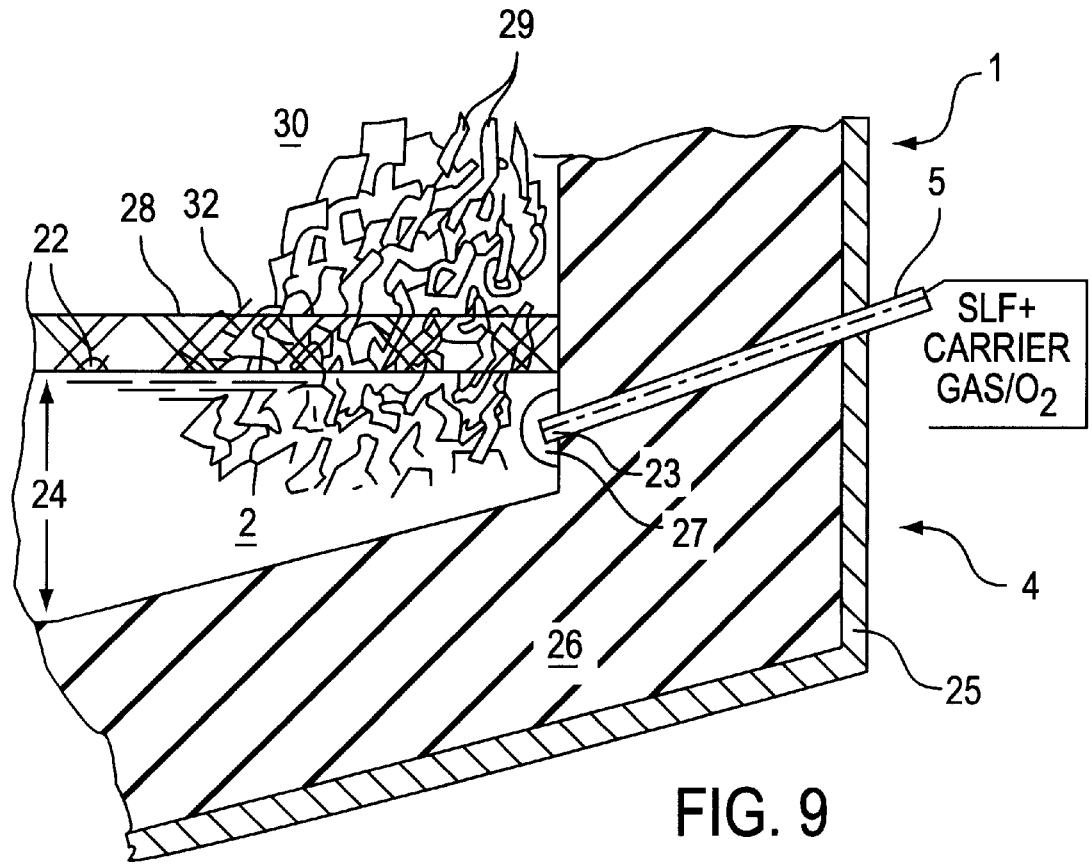
FIG. 9 illustrates positioning of the nozzle within the metallurgical vessel below the melt bath level.
Figure 10:
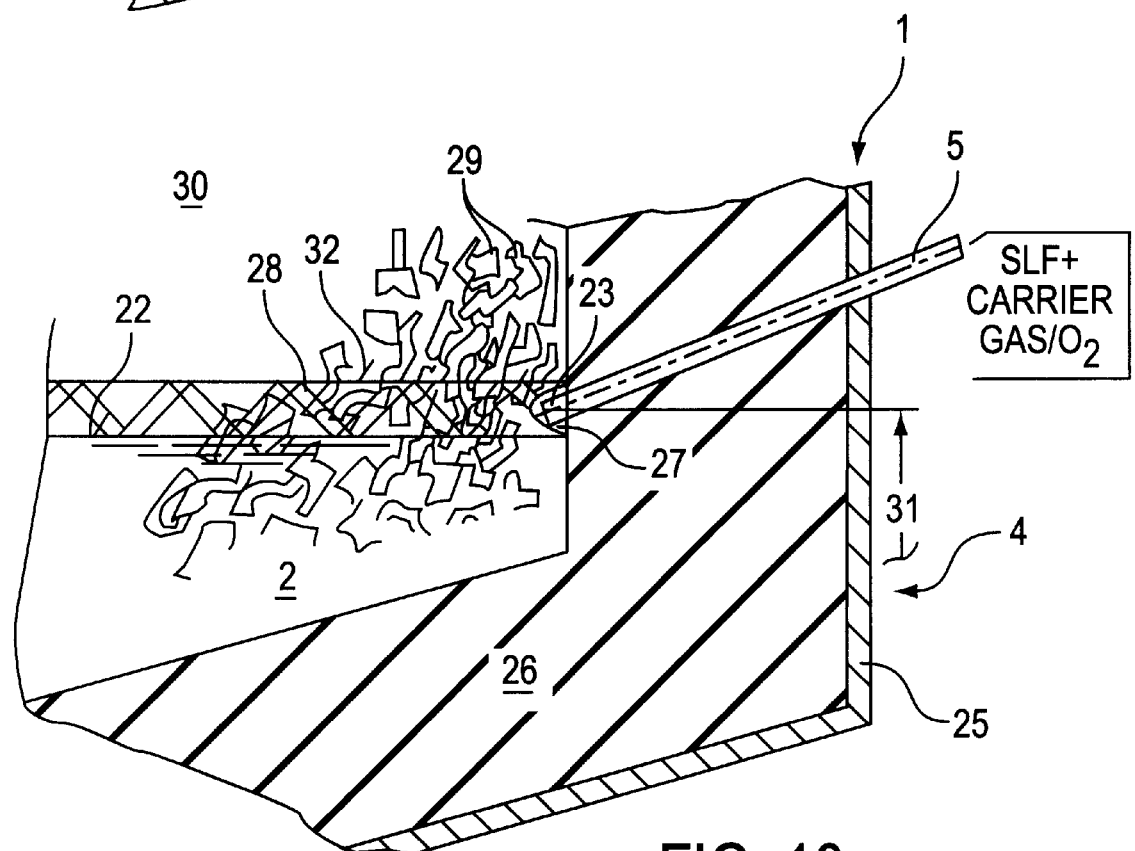
FIG. 10 illustrated positioning of the nozzle within the metallurgical vessel below the slag layer.

FIGS. 9 and 10 indicate various exemplary arrangements for positioning multi-duct nozzles 5 within the lower part 4 of the side wall of metallurgical vessel 1. According to the design represented in FIG. 9, the end section of multi-duct nozzles 5 may be positioned to enter the metallurgical vessel 1 beneath steel melt bath level 22. That is, if steel melt 2 is provided in an amount corresponding to the tapping quantity, mouth 23 of multi-duct nozzle 5 may be located within level 24 of molten metal bath 2. Multi-duct nozzle 5 laterally penetrates the outer metal jacket 25 and refractory lining 26 of metallurgical vessel 1.

As discussed above, the shredder light fraction may include a high cracking energy. Cracking processes may take place between the hydrocarbon gas fed to the melt and the shredder light fraction to yield a cooling effect at the shredder light fraction point of entry into the melt. The cooling effect may be sufficient to form a solid porous mushroom of solidified melt around the main jet point of entry. The solid porous mushroom of solidified melt may protect the point of entry and the refractory material enclosing the point of entry both from erosion by bath agitation of the melt and from oxidation by the fed oxygen. Thus, at mouth 23 of multi-duct nozzle 5, a solid porous mushroom 27 may be formed. As described above, the solid porous mushroom 27 may be formed due to the cracking processes caused by the shredder light fraction and the protective gas entering the molten metal bath 2.

Molten metal bath 2 may be covered by a liquid slag layer 28. Scrap charged into the steel melt may be represented by elements 29. Carbon monoxide gases formed within molten metal melt 2 may ascend through melt 2 or slag layer 28 and oxidize to form carbon dioxide in furnace chamber 30. However, if not enough oxygen is present in furnace chamber 30, oxygen injection nozzles (not shown) may be utilized to supplement the oxygen supply. The heat released herein may be used to efficiently heat scrap 29.

According to FIG. 10, a jacketed nozzle 5 may be located at level 31 of metallurgical vessel 1 in such way that, if an amount of steel melt 2 corresponding to the tapping quantity is provided in the vessel, mouth 23 of the jacketed nozzle 5 may be located within slag layer 28 and beneath slag bath level 32. Mouth 23 of multi-duct nozzle 5 may be exposed to less attacks than with an arrangement beneath steel melt bath level 22, so an even longer service life of the jacketed nozzle can be achieved.

Through multi-duct nozzle 5 of the present invention, the shredder light fraction can be charged into metallurgical vessel 1 at rates of approximately 20 to 200 kg per minute. Further, the hydrocarbon gas consumption may range between approximately 15 and 100 $Nm^3/h$, the nitrogen demand may be between approximately 30 and 250 $Nm^3/h$, and the demand for air used as conveying medium may be between approximately 100 and 3,000 $Nm^3/h$. The pressure of the air used as a conveying medium may vary between approximately 3.6 and 4.5 bar while the shredder light fraction is being conveyed and may be reduced to vary between approximately 1.2 to 1.6 bar when conveying of shredder light fraction is discontinued.

The input of oxygen, hydrocarbon gas, nitrogen and air may vary as a function of the flowability, chemical composition and specific delivery volume of the shredder light fraction.

The process according to the present invention enables an increase of capacity and a savings of electric power for charging metallurgical vessel 1 during steelmaking by scrap melting. In this process, a reproducible carbon monoxide/dioxide development commences as early as possible through steady charging of the shredder light fraction. This further results in a savings of electric melting power in the order of up to approximately 200 kWh/t and/or shortening of a melting-down time.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed:

1. A process for processing a shredder light fraction in a molten metal bath, comprising:

injecting the shredder light fraction and a carrier gas toward the molten metal bath;

forming a main jet comprising the injected shredder light fraction and the injected carrier gas;

injecting oxygen toward the molten metal bath;

forming a secondary jet comprising the injected oxygen;

injecting a protective gas, including at least one of hydrocarbon gas, inert gas, and mixtures thereof, toward the molten metal bath;

forming a gas jet comprising the injected protective gas; and enclosing, at a point of entry into the molten metal bath, the main jet and the secondary jet within the gas jet.

2. The process according to claim 1, the molten metal bath comprising a steel melt and a slag layer.

3. The process according to claim 2, further comprising injecting the shredder light fraction into the slag layer.

4. The process according to claim 1, the protective gas comprising a mixture of nitrogen and natural gas mixture in a ratio within a range of approximately 2:1 to 5:1.

5. The process according to claim 1, wherein the shredder light fraction comprises C, $H_2$, $N_2$, and S in 20% of the total element quantity.

6. The process according to claim 1, the carrier gas comprising at least one of air, nitrogen, and inert gas.

7. The process according to claim 1, further comprising mechanically conveying the shredder light fraction toward a point of entry into the molten metal bath.

8. The process according to claim 1, further comprising injecting the shredder light fraction beneath a steel melt bath level.

9. The process according to claim 1, further comprising injecting the shredder light fraction beneath a slag bath level and above a steel melt bath level.

10. The process according to claim 1, further comprising synchronously feeding an amount of shredder light fraction and carrier gas into the molten metal bath per unit of time in accordance with an amount of protective gas; and monitoring the feeding of each of the amounts.

11. The process according to claim 9, further comprising maintaining the synchronous feeding in accordance with a ratio of shredder light fraction to protective gas between approximately 50 and 200 kg/l $Nm^3$.

12. The process according to claim 1, monitoring the pressure of the main jet prior to entering the molten metal bath;

maintaining the main jet pressure as a function of a delivery volume of the shredder light fraction; and adjusting the pressure of the main jet by increasing an amount of injected oxygen.

13. The process according to claim 12, wherein the shredder light fraction is combustible, and the process further comprises maintaining a ratio of shredder light fraction to oxygen sufficient for stoichiometric combustion of the shredder light fraction.

14. The process according to claim 1, further comprising melting down scrap with electric arc energy.

15. The process according to claim 14, further comprising feeding the shredder light fraction into the molten metal bath during a scrap melting process.

16. The process according to claim 13, further comprising forming the main jet with a gas comprising one of nitrogen and air to keep a point of entry clear.

* * * * *